United States Patent [19]

Yamamoto

[11] Patent Number: 4,704,019
[45] Date of Patent: Nov. 3, 1987

[54] MICROFICHE CARRIER

[75] Inventor: Yasuhiro Yamamoto, Kiyose, Japan

[73] Assignee: Canon Kabushiki Kaisha, Tokyo, Japan

[21] Appl. No.: 810,727

[22] Filed: Dec. 19, 1985

[30] Foreign Application Priority Data

Dec. 28, 1984 [JP] Japan ................................ 59-277794
Aug. 6, 1985 [JP] Japan ................................ 60-172737

[51] Int. Cl.$^4$ ............................................. G03B 23/08
[52] U.S. Cl. ................................... 353/27 R; 353/22; 353/25
[58] Field of Search ....................... 353/22, 23, 24, 25, 353/26 R, 26 A, 27 R, 27 A, 95, 96

[56] References Cited

U.S. PATENT DOCUMENTS

| | | | |
|---|---|---|---|
| 3,565,513 | 2/1971 | Akiyama et al. | 353/22 |
| 3,743,399 | 7/1973 | Smith | 353/23 |
| 3,834,800 | 9/1974 | Browncombe | 353/27 R |
| 3,881,813 | 5/1975 | Maier et al. | 353/27 R |
| 3,917,389 | 11/1975 | Shoji | 353/27 R |
| 4,172,657 | 10/1979 | Watanabe et al. | 353/27 R |

FOREIGN PATENT DOCUMENTS

| | | |
|---|---|---|
| 135539 | 11/1976 | Japan. |
| 84444 | 5/1982 | Japan. |
| 2069171 | 12/1979 | United Kingdom ............. 353/27 R |

Primary Examiner—Charles Frankfort
Assistant Examiner—Patrick R. Scanlon
Attorney, Agent, or Firm—Fitzpatrick, Cella, Harper & Scinto

[57] ABSTRACT

A microfiche carrier has a lower transparent plate supporting a microfiche thereon and changeable over into a horizontal posture and an inclined posture, an upper transparent plate openable and closable relative to the lower transparent plate and urging the microfiche against the lower transparent plate, a posture changing device for changing the posture of the lower transparent plate, and a movable member holding the upper transparent plate and the lower transparent plate and movable along a horizontal plane.

14 Claims, 19 Drawing Figures

MICROFICHE CARRIER

BACKGROUND OF THE INVENTION

1. Field of the Invention

This invention relates to a microfiche carrier provided in a microfiche projection apparatus such as a microfiche reader or a microfiche reader-printer.

2. Description of the Prior Art

A microfiche carrier is a microfiche holding and moving apparatus for moving a microfiche crosswise relative to a projection optical portion to cause a desired image frame of a number of image frames in which images are regularly recorded in the form of a matrix on the surface of the microfiche to be retrieved and positioned at the projection optical portion.

Various types or structures have been proposed for the microfiche carrier, but the type in which plates for sandwiching a microfiche therebetween are movable is most popular. The microfiche carrier of this type has two upper and lower transparent plates for sandwiching a microfiche therebetween and holding it flatly, and a transparent plate moving mechanism for supporting the two upper and lower transparent plates sandwiching the microfiche therebetween and moving the two transparent plates relative to a projection optical portion.

The lower transparent plate is substantilly horizontally supported by the transparent plate moving mechanism, and the upper transparent plate is openable and closable relative to the lower transparent plate, and by the opening and closing thereof, placement of a microfiche onto a predetermined reference position on the lower transparent plate, insertion of the microfiche between the two transparent plates and removal of the used microfiche are accomplished. The opening and closing of the upper transparent plate is either manually effected or automatically effected in response to the movement of the transparent plates to a predetermined position by the moving mechanism.

The retrieving of a desired image frame of the microfiche sandwiched between the upper and lower transparent plates to the projection optical portion is accomplished either by manually operating the transparent plate moving mechanism or by automatic movement control. The manually operated type is such that the transparent plate moving mechanism is manually operated so that the index mark of the transparent plate moving mechanism is adjusted to a coordinates position corresponding to a desired image frame address of an index plate (a frame arrangement coordinates plate) disposed in place on the side of the apparatus body such as a reader, whereby the desired image frame portion is retrieved at a position corresponding to the projection optical portion. The automatic type is such that the address (or number) of a desired image frame is designated and input to a control circuit, whereby the transparent plate moving mechanism is automatically controlled in accordance with the input address and the desired image frame portion of the microfiche is retrieved at a position corresponding to the projection optical portion.

In any of the microfiche carrier of the manual retrieving type and the microfiche carrier of the automatic retrieving type as described above, for accurate retrieving of a desired image frame, it is important to accurately position and place a microfiche in advance at a predetermined reference position relative to the lower transparent plate and hold down the positioned and placed microfiche as it is by means of the upper transparent plate.

If the microfiche is set between the upper and lower transparent plates while positionally deviating from the predetermined reference position, in the case of the manual retrieving type, accurate retrieving of a desired image frame cannot be accomplished because of its corresponding deviation from the index plate. Again in the case of the automatic retrieving type, accurate retrieving of a desired image frame cannot be accomplished because of its corresponding deviation from the amount of automatic drive control of the transparent plate moving mechanism based on the input address of the desired image frame.

The microfiche is a film in the form of a thin, light sheet and therefore, even if it is accurately positioned and placed at the predetermined reference position on the lower transparent plate, when the hand or fingers are released from the microfiche, the microfiche is liable to slide naturally and readily on the lower transparent plate and thus is liable to positionally deviate from the predetermined reference position. Particularly, when the lower transparent plate and the microfiche placed thereon are not in intimate contact and an air layer is present therebetween with the underside of the microfiche floating from the surface of the lower transparent plate or when the projection apparatus is installed in an inclined posture and therefore the lower transparent plate is inclined beyond a certain degree, the above-described sliding and positional deviation of the placed microfiche is liable to occur. Also, a shock or wind pressure occurring when the upper transparent plate is closed relative to the lower transparent plate may readily result in the above-described sliding and positional deviation of the placed microfiche. Accordingly, it has actually been very difficult and often cumbersome to accurately position the microfiche between the upper and lower transparent plate without any positional deviation from the predetermined reference position and set the microfiche in its sandwiched position.

So, for example, it has been proposed to provide on the lower transparent plate side a plate spring member for holding down the leading end edge of a microfiche and hold down the leading end edge of the microfiche relative to the surface of the lower transparent plate by the plate spring, thereby preventing the sliding and positional deviation of the microfiche placed on the lower transparent plate from the predetermined reference position. However, this is liable to injure the leading end edge of the microfiche by the insertion or removal thereof between the holding-down plate spring and the lower transparent plate.

SUMMARY OF THE INVENTION

It is an object of the present invention to provide a microfiche carrier designed such that the problem of injury of the microfiche as described above does not arise and moreover the microfiche can always be accurately, easily and quickly positioned at the predetermined reference position between the upper and lower transparent plates and set in its sandwiched position.

It is another object of the present invention to provide a microfiche carrier which can not only accurately position a microfiche but also readily permits insertion and removal of the microfiche.

The present invention consists of a microfiche carrier of the type in which the two plates sandwiching a microfiche therebetween are movable as described above and in which the lower transparent plate is changed over into and held in an inclined posture wherein the reference position side of the microfiche relative to the lower transparent plate is lower when the upper transparent plate is in an opened position and the lower transparent plate is changed over into and held in a substantially horizontal posture when the upper transparent plate is in a closed position.

That is, when the upper transparent plate is in the opened position, the lower transparent plate is changed over into and held in the inclined posture wherein the reference position side of the microfiche relative to the lower transparent plate is lower, whereby a sliding-down force toward the reference position always acts on the microfiche placed on the lower transparent plate in the inclined posture.

As a result, the microfiche once positioned at the predetermined reference position on the lower transparent plate with a side thereof striking against a positioning member has the positioned state positively maintained by said sliding-down force, and even when the hand or fingers have actually been released from the microfiche or even when the shock or wind pressure in the closing process of the upper transparent plate acts on the microfiche, the microfiche does not readily deviate from the predetermined reference position and the initially positioned and placed state thereof is stably maintained. Even if the hand or fingers are released from the microfiche or even if the placed microfiche is mvoed away from the positioning member by the shock or wind pressure during the closing of the upper transparent plate, the microfiche will be immediately returned to its original positioned and placed state in which it strikes against and is received by the positioning member, by said sliding-down force.

Accordingly, the positioning and placement of the microfiche at the predetermined reference position on the lower transparent plate and the holding-down of the microfiche by the upper transparent plate with the placed state of the microfiche maintained can always be accomplished accurately and quickly.

Furthermore, the problem of injury of the leading end edge of the microfiche as encountered in the microfiche carrier of the type in which the microfiche is held down by the holding-down plate spring member does not arise.

DESCRIPTION OF THE PREFERRED EMBODIMENTS

The present invention will hereinafter be described with respect to some specific embodiments thereof shown in the drawings.

(First Embodiment)

Figure 1:
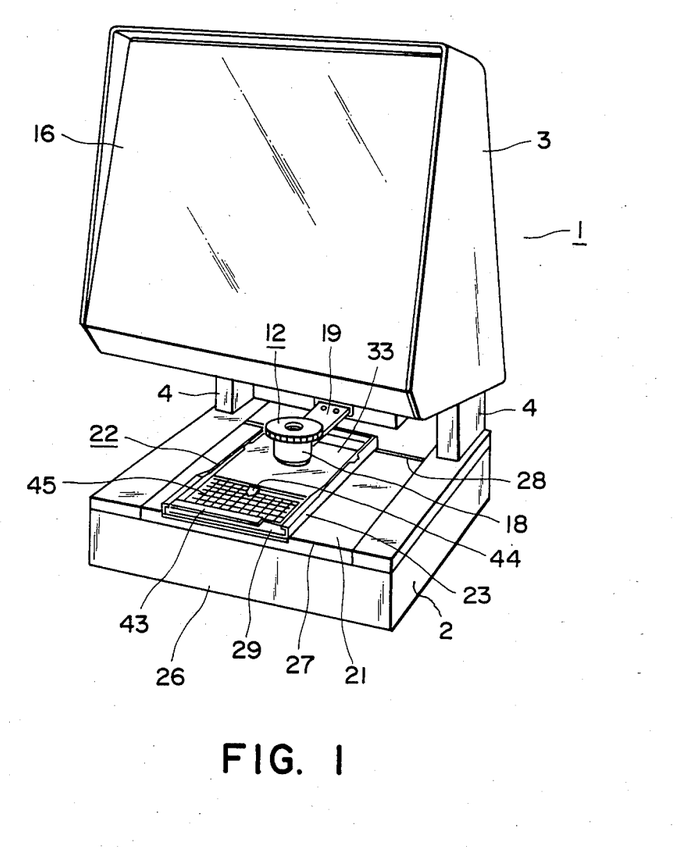
FIG. 1 is a perspective view of an example of the microfiche reader equipped with a manually operated carrier according to the present invention.
Figure 2:
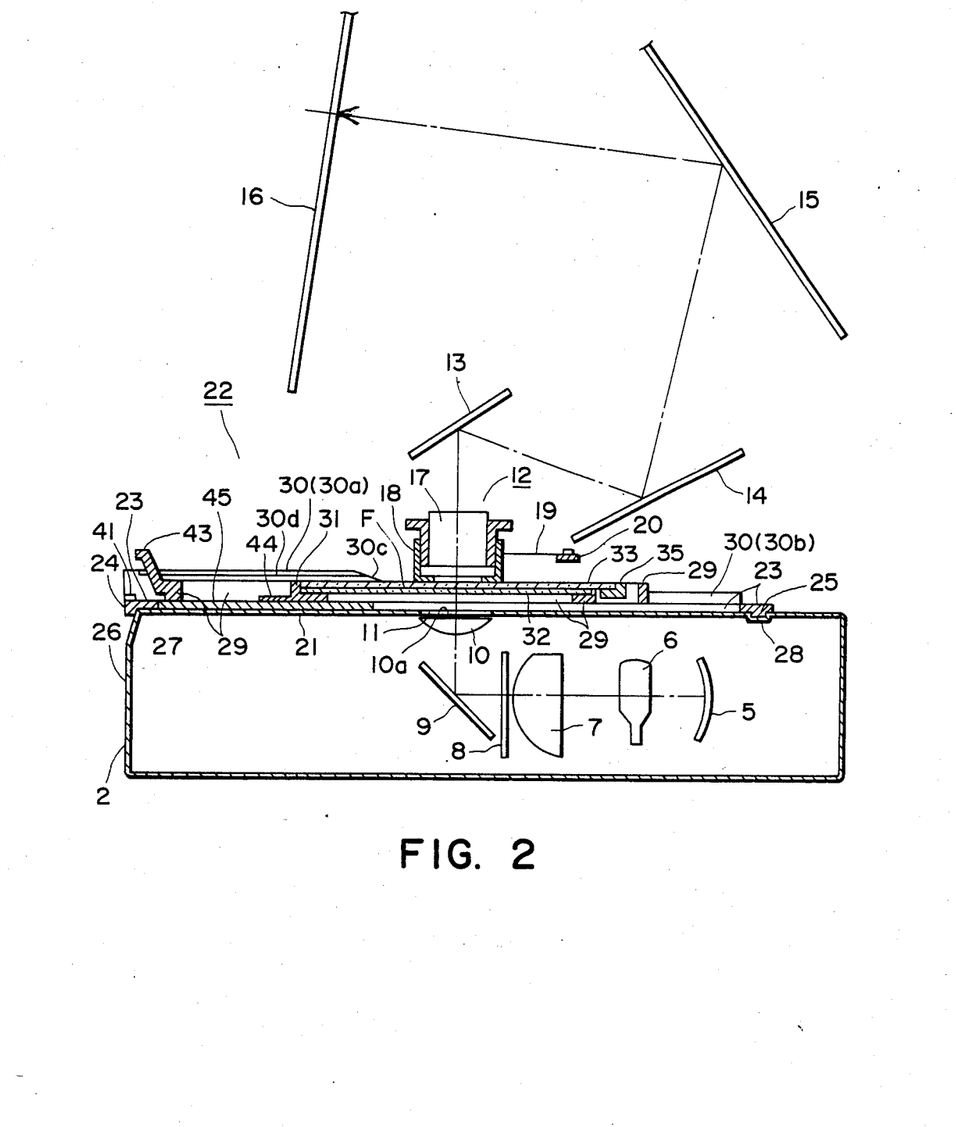
FIG. 2 shows a projection optical system.

The present embodiment is a microfiche reader equipped with a manually operated type microfiche carrier according to the present invention. FIG. 1 is a perspective view of the entire microfiche reader, and FIG. 2 shows a projection optical system.

Reference numeral 1 generally designates the reader, reference numeral 2 denotes the lower case of the reader, and reference numeral 3 designates an upper case supported above the lower case by means of struts 4. In the lower case 2, there are contained an illuminating system comprising a light source lamp 6 with a reflecting concave mirror 5 disposed behind it, a condenser lens 7, an adiabatic filter 8, a reflecting mirror 9, a diffusing lens 10 having a diffusing surface 10a, etc., a heat discharging fan, an electric circuit, etc. The illuminating light travels upwardly from an opening 11 formed substantially at the center of the upper plate 21 of the lower case 2. A diffusing screen 16 is disposed over the front opening of the upper case 3, and three optical path changing mirrors 13, 14 and 15 are contained in the upper case 3.

Reference numeral 12 designates an imaging lens assembly disposed between the opening 11 and the mirror 13 and comprising a lens barrel 17 and a pressure contact cylinder 18 in which the lens barrel 17 is loosely fitted. The pressure contact cylinder 18 is supported by the fore end of a plate spring 19 having the rear end thereof fixed to the immovable member 20 of the upper case 3 and is vertically pivotable by the resiliency of the plate spring 19. The underside of the pressure contact cylinder 18 is normally kept in intimate pressure contact with the upper surface of the upper transparent plate 33 of the microfiche carrier which will later be described with a moderate force by the resiliency of the plate spring 19, and the upper transparent plate 33 is movable along the underside of the pressure contact cylinder 18 upon operation of the microfiche carrier while keeping contact with said underside.

When a desired image frame portion of a microfiche F set between the lower transparent plate 32 and the upper transparent plate 33 of the microfiche carrier is retrieved and positioned at the illuminating portion (the projection optical portion) between the opening 11 and the imaging lens assembly 12, the image of that image frame is enlargedly projected onto the front screen 16 of the upper case 3. In the case of a reader-printer, by a copy button being depressed, the image of that image frame is enlargedly projected onto the photosensitive medium or the like of a copying mechanism, whereby a copy thereof is obtained.

The microfiche carrier generally designated by 22 is disposed on the upper plate 21 of the lower case 2. Reference numeral 23 designates a first movable frame as a component of the microfiche carrier. Parallel left and right ridges 24 and 25 are formed on the underside of the first movable frame 23 at the edges thereof on this side and that side along the length of these edges, the ridge 24 on this side being engaged with a corner edge portion 27 at which the front plate 26 and the upper plate 21 of the lower case 2 merge with each other, and the ridge 25 on that side being fitted in a groove 28 formed in the upper plate 21 in the left to right direction thereof. Thus, the first movable frame 23 is slidable on the upper plate 21 of the lower case 2 in the transverse direction thereof (X—X) with the corner edge portion 27 and the groove 28 as the guides.

Reference numeral 29 denotes a second movable frame. The second movable frame 29 is fitted between parallel side walls 30 and 30 provided longitudinally on the upper surface of the left and right edges of the first movable frame 23 along the length of these edges and is supported on the first movable frame 23, and is slidable on the first movable frame 23 in the longitudinal direction (Y—Y) perpendicular to the direction of movement of the first movable frame with the side walls 30 and 30 as the guides.

The second movable frame 29 has a lateral frame edge 31 provided therein, and is divided into a forward small window frame portion and a rearward large window frame portion with the lateral frame edge 31 as the boundary, and in the case of the present embodiment, the sizes of the forward and rearward window frame portions (the areas of the window frame openings) are about ⅓ and about ⅔, respectively, of the size of the entire second movable frame 29.

As regards a first half portion 30a and a second half portion 30b into which each side wall 30 of the first movable frame 23 is divided with a position nearer to the fore end than the substantially intermediate lengthwise position thereof as the boundary, the upper surface of the first half portion 30a is provided with a level difference overlying the upper surface of the second half portion 30b, and the boundary portion between the two portions 30a and 30b is formed as an inclined portion 30c. The side wall of the first half portion 30a is formed with inwardly facing visor-like projected edges 30d, 30d at the inner upper portion thereof. These projected edges 30d, 30d serve to prevent floating up (floating off) of the second movable frame 29 from between the side walls 30 and 30.

Reference numerals 32 and 33 designate two lower and upper transparent plates (such as glass plates or resin plates) disposed and held in the rearward large window frame portion of the second movable frame 29 and nipping the microfiche F therebetween. The arrangement and structure of these transparent plates 32 and 33 will hereinafter be described with refererence to FIGS. 3 to 6.

Figure 3:
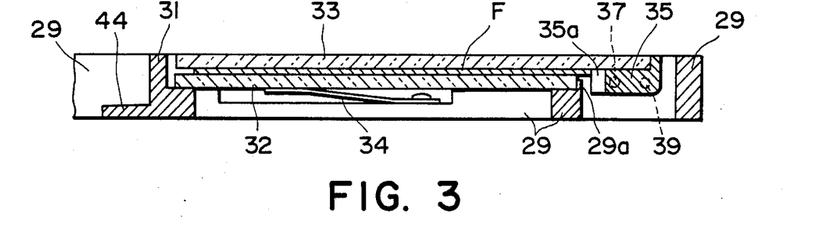
FIGS. 3 and 7 are a cross-sectional view and a perspective view, respectively, of an upper transparent plate when in a closed position.
Figure 4:
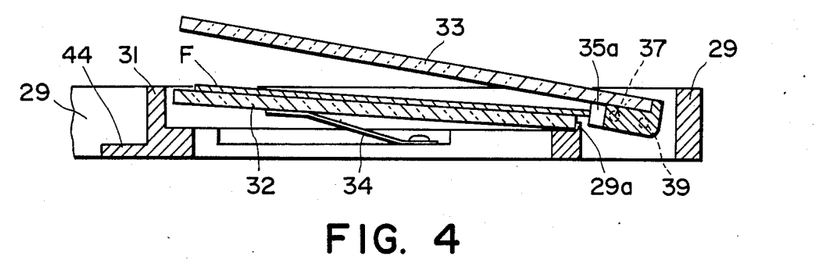
FIGS. 4 and 8 are a cross-sectional view and a perspective view, respectively, of the upper transparent plate when in an opened position.

The lower transparent plate 32 is disposed in the rearward window frame portion of the second movable frame 29 through a pair of pushing-up plate springs 34 disposed with their base portions fixed to the left and right frame edges, respectively.

This lower transparent plate 32 is such that:

(1) When, as will be described later, the upper transparent plate 33 remains open relative to the plate 32 and the weight of the upper transparent plate 33 is not applied to the plate 32, this side of the plate 32 is raised and pivoted by the force of the pushing-up plate springs 34 with the portion of contact between the inner edge of the lower transparent plate 32 and the stepped portion 29a of the frame 29 receiving said inner edge as the fulcrum and the plate 32 floats up from the frame portion in a rearwardly inclined posture, as shown in FIG. 4; and (2) When, conversely, the upper transparent plate 33 is closed and the total weight thereof is applied to the lower transparent plate 32, the pushing-up plate springs 34 are pressed downwardly into the frame portion and the lower transparent plate 32 as well as the upper transparent plate 33 is held in a substantially horizontal posture, as shown in FIG. 3.

The plate springs 34 are of such a resiliency characteristic that when the upper transparent plate 33 is opened, the plate springs push up the lower transparent plate 32 into a rearwardly inclined posture of the order of 5°–10° and that when the upper transparent plate 33 is closed, the plate springs press down the lower transparent plate 32 until the latter is completely received into the frame portion.

Figure 6:
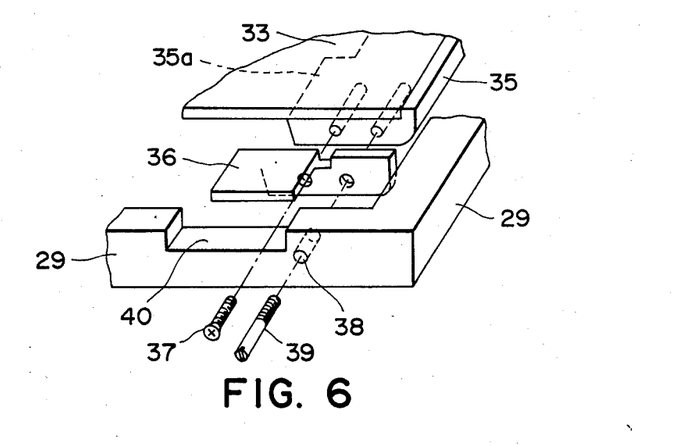
FIG. 6 is an exploded perspective view of an end portion of a member for pivoting the upper transparent plate.

The upper transparent plate 33 has a pivotable member 35 adhesively or otherwise secured to the underside of the inner edge thereof along the length thereof, and a pair of outwardly projected small plate-like slidable members 36, 36 are integrally mounted on the left and right end portions of the pivotable member 35 by means of screws 37 (FIG. 6). The left and right end portions of the pivotable member 35 are connected to the left and right frame edges of the frame 29 by shaft pins 39 received in small holes 38 formed in the respective frame edges. Accordingly, the upper transparent plate 33 is pivotable about the shaft pins 39 relative to the lower transparent plate 32.

The pair of left and right small plate-like slidable members 36, 36 protrude from cut-away stepped portions 40 formed in the left and right frame edges of the frame 29 to the upper portions of the left and right side walls 30, 30 of the first movable frame 23, and when the second movable frame 29 is slidingly moved longitudinally on the first movable frame 23, the small plate-like slidable members 36, 36 slidingly move longitudinally on the upper surfaces of the second half portions 30b, 30b of the side walls 30, 30 with the movement of the second movable frame 29.

Designated by 35a are protrusions as members inwardly formed on the left and right ends of the pivotable member 35 and receiving and positioning the inner side edge of the microfiche F placed on the lower transparent plate 32.

Figure 7:
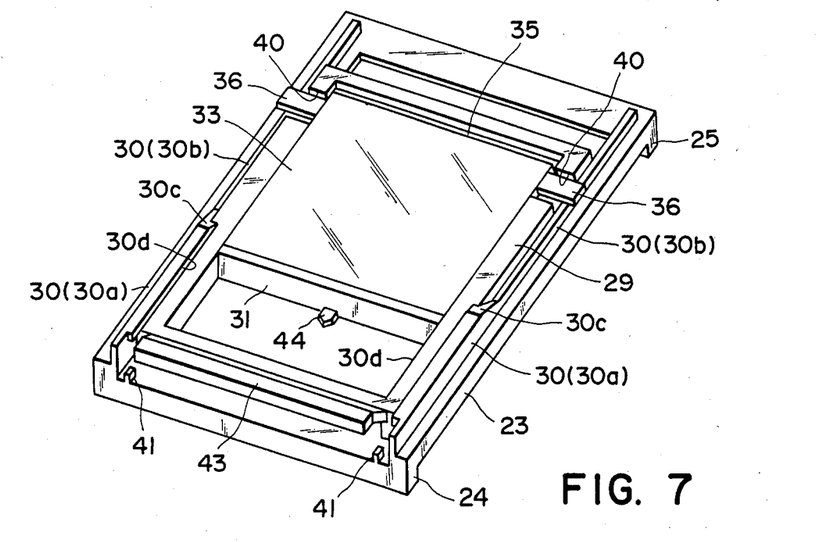

Reference numeral 41 (FIG. 7) denotes guide members projectedly provided on the left and right portions of the upper surface of this side of the first movable frame 23, and reference numeral 42 (FIG. 8) designates guide member engaging and guiding grooves formed at the underside positions of the left and right frame edges of the second movable frame 29 corresponding to the positions of the guide members 41, along the length of the frame edges. The second movable frame 29 is longitudinally guided by the left and right longitudinal side walls 30, 30 of the first movable frame 23 and is also longitudinally guided by the engagement between the guide members 41 and the guiding grooves 42.

Reference numeral 43 designates an operating knob formed on the frame edge on this side of the second movable frame 29, reference numeral 44 denotes an index mark projectedly provided in the small window frame portion at the lengthwisely central position of the cross frame edge 31 of the second movable frame 29, and reference numeral 45 designates an index plate removably mounted at a predetermined surface position on the upper plate 21 of the lower case 2.

When the operator operates the knob 43 longitudinally and transversely by holding it between his fingers, the transparent plates 32 and 33 are moved longitudinally and transversely (X and Y movement) relative to the illuminating portion between the opening 11 and the imaging lens assembly 12 by the longitudinal movement (Y—Y) of the second movable frame 29 relative to the first movable frame 23 and the transverse movement (X—X) of the first movable frame 23 relative to the upper plate 21 of the lower case.

Figure 8:
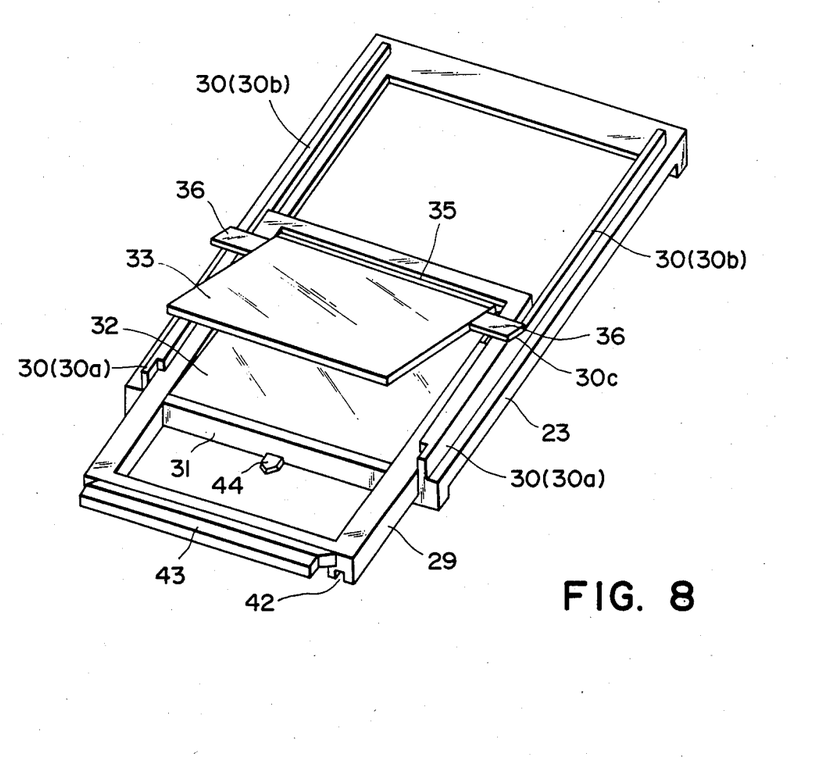

When the microfiche F is to be set, the second movable frame 29 is drawn out forwardly until the slidable members 36, 36 arrive at and ride onto the inclined portion 30c between the first half portion 30a and the second half portion 30b of the side walls 30, 30. By the slidable members 36, 36 riding onto the inclined portion 30c, the upper transparent plate 33 is upwardly pivoted for opening about the shaft pins 39 (FIGS. 4 and 8). Also, by the opening of this upper transparent plate 33, the lower transparent plate 32 is held in a rearwardly inclined posture by the pushing-up plate springs 34, as described in item (1) above. So, the microfiche F is inserted onto the lower transparent plate 32 through the forward opening defined by the lower transparent plate 32 and the upper transparent plate 33 which are opened, and the inner side edge of the microfiche F is caused to bear against the positioning member 35a formed on the pivotable member 35 of the upper transparent plate 33 and the left side edge or the right side edge of the microfiche F is caused to bear against the inner surface of the left or right frame edge of the second movable frame 29, whereby the microfiche is positioned and placed at a predetermined reference position on the lower transparent plate 32. The micofiche F thus placed is stably held without any positional deviation from the initially set predetermined reference position as previously described because the lower transparent plate 32 is downwardly inclined toward the positioning member 35a.

Figure 5:
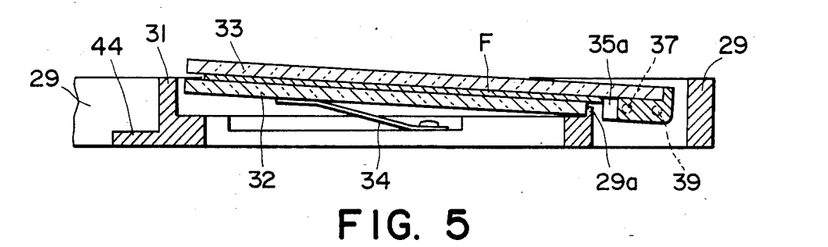
FIG. 5 is a cross-sectional view of the upper transparent plate when in the course of closing.

After the microfiche F has been placed, the second movable frame 29 is moved backwardly. Thereupon, the slidable members 36, 36 move down from the inclined portions 30c, 30c to the second half portions 30b, 30b of the side walls 30, 30. By the slidable members 36, 36 moving down from the inclined portions 30c, 30c the upper transparent plate 33 is pivoted for closing about the shaft pins 39 relative to the lower transparent plate 32. In its process of pivoting for closing, the upper transparent plate 33 falls down onto the lower transparent plate 32 which is then in its inclined posture, and cooperates with the lower transparent plate 32 to sandwich the microfiche F therebetween as shown in FIG. 5, and further falls down, whereby the weight of the upper transparent plate 33 is applied to the lower transparent plate 32 and finally, the pushing-up plate springs 34 are pressed down as described in item (2) above and as shown in FIG. 3, and the lower transparent plate 32 as well as the upper transparent plate 33 is received in the frame portion and is held in a substantially horizontal posture. Thus, the lower transparent plate 32 is held in its inclined posture until the upper transparent plate 33 is pivoted for closing and the microfiche F is held down in a sandwiched state, and therefore, the microfiche is not readily displaced from the predetermined reference position even if a shock or wind pressure is created with the closing movement of the upper transparent plate 33, and thus, the microfiche is stably sandwiched between the lower and upper transparent plates 32 and 33 at that position.

The closed position of the lower and upper transparent plates 32 and 33 shown in FIG. 3 is maintained because no pivoting force for opening acts on the upper transparent plate 33 as long as the slidable members 36, 36 slidingly move over the ranges of the lengths of the second half portions 30b, 30b of the side walls 30, 30 with the longitudinal movement of the second movable frame 29.

Figure 9:
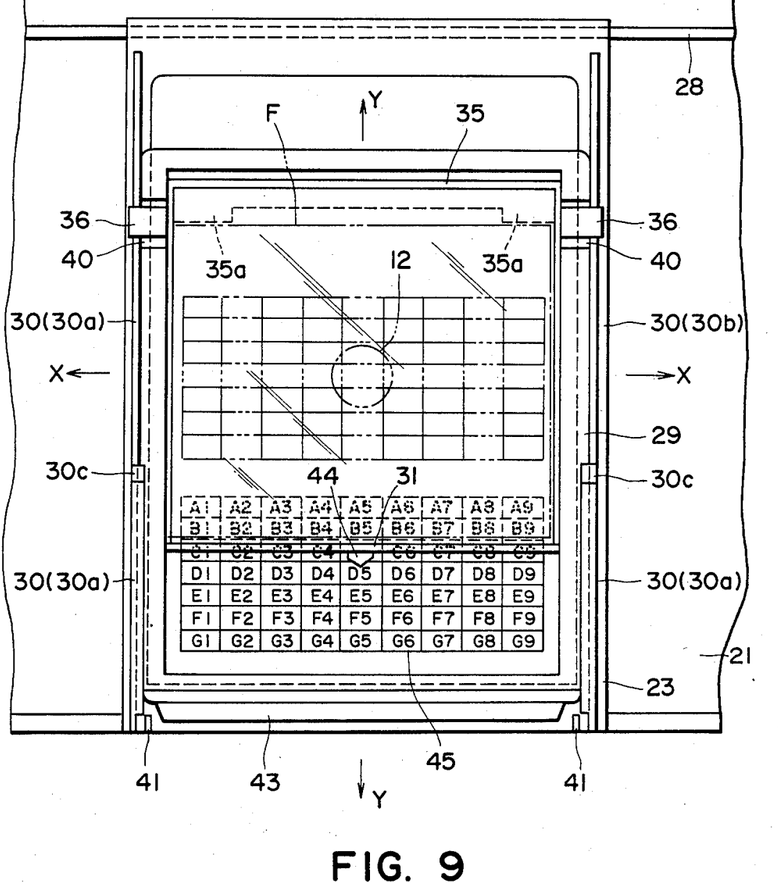
FIG. 9 is a plan view of the entire carrier.

Thus, thereafter, by moving the second movable frame 29 in the longitudinal direction Y—Y and the first movable frame 23 in the transverse direction X—X by operating the knob 43 so as to adjust the index mark 44 to a coordinates position corresponding to the desired image frame address of the index plate 45, the desired image frame portion in the microfiche F sandwiched between the lower and upper transparent plates 32 and 33 is retrieved and positioned at the projection optical portion. FIG. 9 shows a state in which the knob 43 has been operated so that the index mark 44 corresponds to the coordinates D5 of the index plate 45 and the image frame portion of the microfiche F corresponding to the coordinates D5 has been retrieved and positioned at the projection optical portion.

(Other Embodiments)

Figure 10:
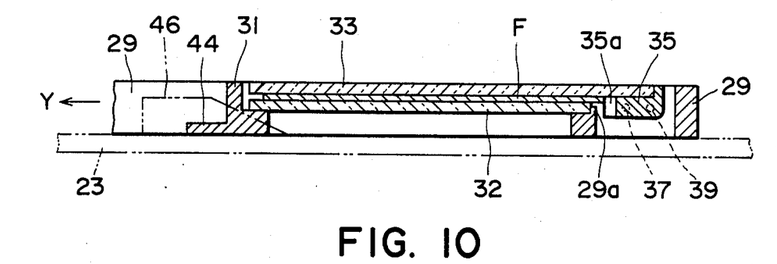
FIG. 10 is a cross-sectional view of an upper transparent plate in another embodiment when in a closed position.
Figure 11:
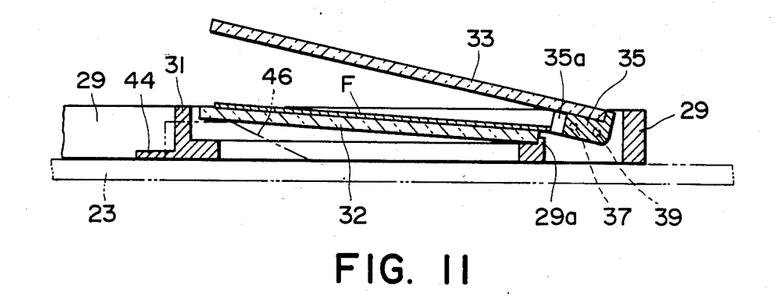
FIG. 11 is a cross-sectional view of the upper transparent plate of FIG. 10 when in an opened position.
Figure 12:
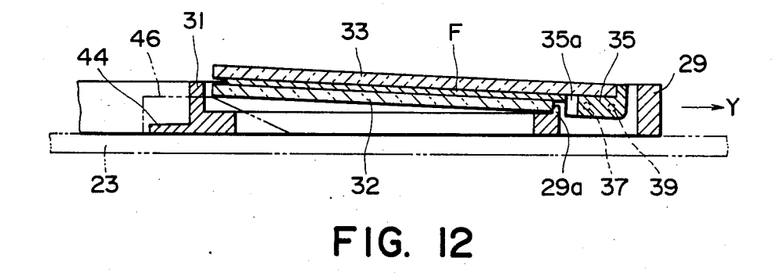
FIG. 12 is a cross-sectional view of the upper transparent plate of FIG. 10 when in the course of closing.

Various other means than the pushing-up plate springs 34 in the above-described embodiment are conceivable as the means for changing the lower transparent plate 32 into the inclined posture during the opened state of the upper transparent plate and changing the lower transparent plate into the substantially horizontal posture during the closed state of the upper transparent plate. FIGS. 10 to 12 show another example in which the above-described changing operation is effected by cams instead of the plate springs 34.

In these Figures, reference numeral 46 designates cam members for pivoting the lower transparent plate which are disposed at the left and right frame edges of the first movable frame 23. The second movable frame 29 is moved forwardly to open the upper transparent plate 33, and at a point of time a little earlier than the time when the slidable members 36, 36 arrive at and ride onto the inclined portions 30c, 30c of the side walls 30, 30, the fore end of the lower transparent plate 32 arrives at the position of the cam members 46 each having an inclined cam surface, and with the continued forward movement of the second movable frame 29, the lower transparent plate 32 rides onto said cam surfaces and becomes rearwardly downwardly inclined and finally, as shown in FIG. 11, it rides on said cam surfaces and is held in a sufficient rearwardly downwardly inclined posture, and in the meantime, the slidable members 36, 36 also ride onto the inclined portions 30c, 30c and the upper transparent plate 33 also becomes sufficiently pivoted for opening.

When the microfiche F is placed onto the lower transparent plate 32 and the second movable frame 29 is moved backwardly, the upper transparent plate 33 is first pivoted for closing in the process of said backward movement, and then falls down onto the lower transparent plate 32 which is still riding on the cam surfaces of the cam members 46 and is in its rearwardly downwardly inclined state, as shown in FIG. 12, and the microfiche F resting on the lower transparent plate is held down in a sandwiched state. With the continued backward movement of the second movable frame 29, the fore end of the lower transparent plate 32 descends and separates from the cam members 46 and becomes received onto the second movable frame 29 and held in a substantially horizontal posture. In the meantime, the slidable members 36, 36 separate from the inclined portions 30c, 30c and the upper transparent plate 33 also becomes closed in a substantially horizontal posture on the lower transparent plate 32 with the microfiche F sandwiched therebetween.

Cam member receiving grooves for avoiding the interference with the cam members 46 are formed in the second movable frame 29.

Figure 13:
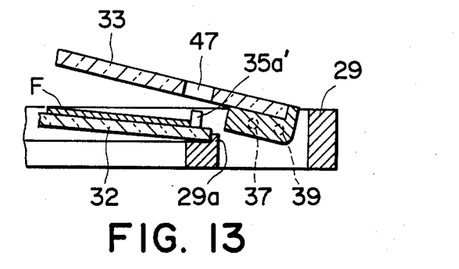
FIG. 13 is a cross-sectional view showing another example of the mirofiche positioning member.

FIG. 13 shows an example in which the member 13a for receiving and positioning the inner side edge of the microfiche F is provided in the form of a pair of projections 35a' on the left and right portions of the upper surface of the lower transparent plate 32 adjacent to the inner side edge thereof. Designated by 47 is an escape hole for the projections 35a' which is formed in the upper transparent plate 33.

Figure 14:
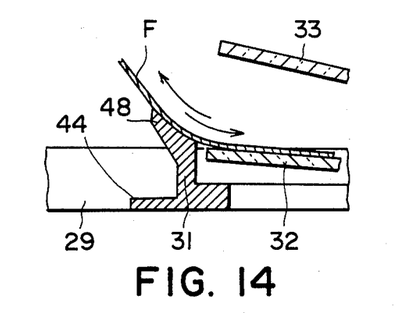
FIG. 14 is a cross-sectional view of an example in which a smooth insertion and removed guide surface portion for the microfiche is formed.

FIG. 14 shows an example in which the upper surface of the cross frame edge 31 on this side of the lower transparent plate is formed into a concave or inclined surface 48 for smoothly guiding the microfiche so that smooth insertion and removal of the microfiche F onto and from the lower transparent plate 3 may be accomplished when the upper transparent plate is in its opened position.

Figure 15:
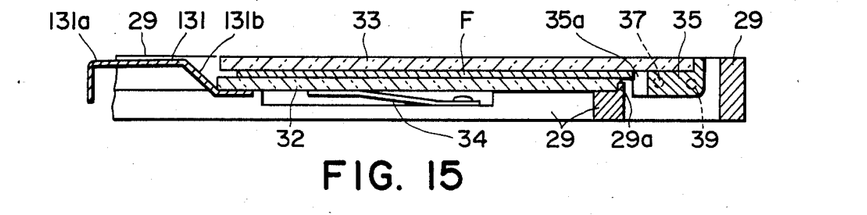
FIGS. 15 to 17 are cross-sectional views showing further embodiments of the present invention.
Figure 16:
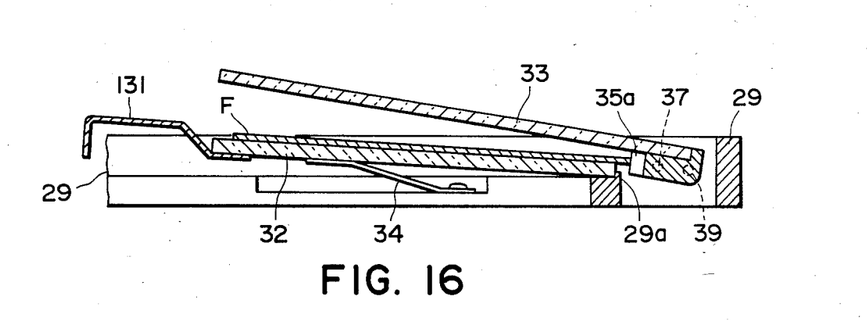
Figure 17:
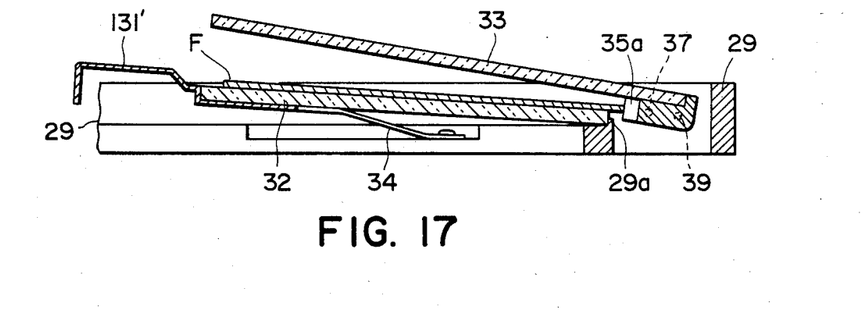

FIGS. 15 to 17 show still further embodiments of the present invention. In these Figures, members similar to those in the previously described embodiments are given similar reference characters.

In FIG. 15, reference numeral 131 designates a microfiche guide member provided on the lower transparent plate 32. The microfiche guide member 131 has a substantially horizontal guide surface 131a and an inclined guide surface 131b lying alone the upper surface of the lower transparent plate 32, and the fore end of the guide member 131 is fixed to the underside of the lower transparent plate 32.

The guide member 131 guides the microfiche along the guide surfaces 131a and 131b during the insertion and removal of the microfiche into and from between the transparent plates 32 and 33. FIG. 15 shows the closed position of the upper transparent plate, and FIG. 16 shows the opened position of the upper transparent plate.

Figure 18:
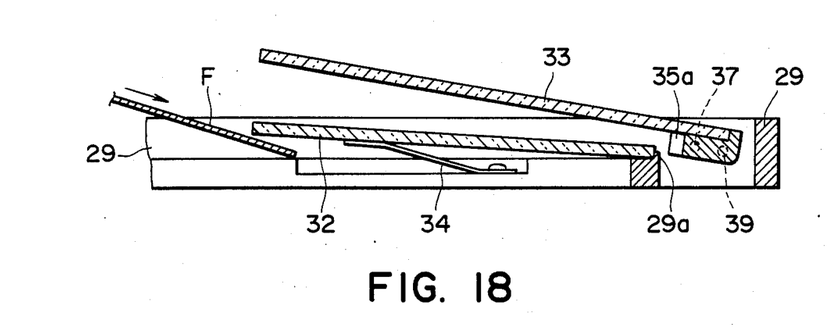
FIGS. 18 and 19 illustrate a problem encountered during the insertion and removal of the microfiche.
Figure 19:
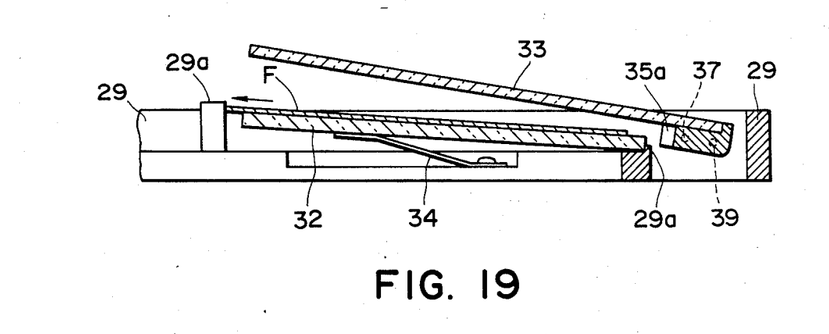

When the transparent plates 32 and 33 are in their opened positions as shown in FIG. 16, the microfiche to be inserted is fed onto the lower transparent plate 32 along the guide surfaces 131a and 131b of the guide member 131, and the microfiche now placed on the lower transparent plate 32 is drawn out along said guide surfaces, whereby the insertion and removal of the microfiche can be accomplished smoothly. As a result, the problem that as shown in FIGS. 18 and 19, the microfiche comes under the lower transparent plate 32 when the microfiche is inserted or that the microfiche is caught by a protrusion 29a provided on this side of the second movable frame 29 for the prevention of said accident and cannot be removed when the microfiche is to be removed can be eliminated.

FIG. 17 shows an example in which a microfiche guide member 131' is formed integrally with the plate spring 34. A portion of the guide member 131' is normally urged against the underside of the lower transparent plate 32 by the force of the plate spring 34. Thus, the posture of the guide member 131' changes in accordance with a change in the posture of the lower transparent plate 32.

The present invention can also be applied to a fiche carrier having an automatic transparent plate moving mechanism for effecting automatic retrieval. Also, the present invention can be applied not only to a microfilm reader but also to a reader-printer, a copying apparatus using sheet originals, etc.

According to the present invention, as described above, in a microfiche carrier of the type in which the plates sandwiching a microfiche therebetween are movable, the microfiche can always be easily and quickly positioned at a predetermined reference position between the upper and lower transparent plates and moreover can be brought into a sandwiched set position without being injured and accordingly, accurate retrieving of any desired image frame can be accomplished and the operability of the reader or the like is improved. Also, the insertion and removal of the microfiche can be accomplished smoothly.

The image bearing sheet to be projected is not limited to a microfiche, but use may be made of a sheet original such as an aperture card or a strip film.

I claim:

1. A microfiche carrier comprising:
   a movable member being movable along a plane;
   a lower transaprent plate adapted to hold a microfiche, one end of said lower transparent plate defining an axis, said lower transparent plate being pivotably mounted on said movable member about said axis;
   an upper transparent plate mounted on said movable member and pivotable between a first position where said upper plate overlays said lower transparent plate and a second position where said upper plate is apart from said lower transparent plate;
   pivoting means for selectively causing said lower transparent plate to be pivoted in accordance with the position of said upper transparent plate; and
   holding means for holding said one end of said lower transparent plate at a generally planar position during the pivot of said lower transparent plate.

2. A carrier according to claim 1, wherein said pivoting means comprises a cam member for causing said lower transparent plate to pivot in accordance with the movement of said movable member when said movable member is moved along said plane.

3. A carrier according to claim 1, wherin said pivoting means comprises a spring member for urging a lower surface of said lower transparent plate.

4. A carrier according to claim 2, wherein said movable member comprises a first frame movable in a first direction along said plane and a second frame movable in a second direction independently of said first frame, said lower transparent plate and said upper transparent plate being disposed on said second frame and said cam member being disposed on said first frame.

5. A carrier according to claim 3, wherein said movable member comprises a first frame movable in a first direction along said plane and a second frame mounted on said first frame and movable in a second direction independently of said first frame, said lower transparent plate, said upper transparent plate and said spring member being disposed on said second frame.

6. A carrier according to claim 1, further comprising a positioning member for positioning a microfiche on said lower transparent plate, said positioning member being disposed on said upper transparent plate.

7. A carrier according to claim 1, further comprising a guide member for guiding the microfiche onto said lower transparent plate, said guide member being capable of pivoting together with said lower transparent plate.

8. A carrier according to claim 7, further comprising an operation unit for operating said movable member, said operating unit being pivoted together with said guide member.

9. A carrier according to claim 3, further comprising a guide member for guiding for microfiche onto said lower transparent plate, said guide member being so urged as to be pivoted by said spring member.

10. A projection apparatus for projecting the image of an image bearing sheet, comprising;
   optical means for projecting the image of the image bearing sheet;
   a base plate adapted to hold said image bearing sheet, one end of said base plate defining an axis, said base plate being pivotable about said axis;
   a press plate adapted to press said image bearing sheet against said base plate and pivotable between a horizontal position and an inclined position about a portion near one end thereof as an axis;
   a carrier member supporting said base plate and said press plate and being movable along a plane perpendicular to an optical axis of said optical means;
   pivoting means for selectively causing said base plate to pivot in accordance with the position of said press plate; and
   a holding member mounted on said carrier member and holding said one end of said base plate at a generally planar position during the pivot of said base plate.

11. An apparatus according to claim 10, wherein said pivoting means comprises a spring member for urging a lower surface of said base plate.

12. An apparatus according to claim 11, further comprising a guide member for guiding the image bearing sheet onto said base plate, and an operation unit incorporated with said guide member for operating said carrier member, said guide member being mounted on said base plate.

13. A projection apparatus adapted for projecting an image of a sheet original placed on an original support table to an imaging position, comprising:
   a press member swingable between a first position where said press member presses said original placed on said original support table against said support table and a second position where said press member does not press said original;
   pivoting means for selectively causing said support table to be pivoted while holding one end portion of said support table at a generally planar position in accordance with the position of said press member; and
   a positioning member for positioning said original at a predetermined position on said support table.

14. An apparatus according to claim 13, further comprising a guide member adapted for pivoting together with said support table and guiding the original onto said support table.

* * * * *

UNITED STATES PATENT AND TRADEMARK OFFICE
CERTIFICATE OF CORRECTION

PATENT NO. : 4,704,019
DATED : November 3, 1987
INVENTOR(S) : YASUHIRO YAMAMOTO

It is certified that error appears in the above-identified patent and that said Letters Patent is hereby corrected as shown below:

COLUMN 1

Line 27, "substantilly" should read --substantially--.

COLUMN 3

Line 31, "mvoed" should read --moved--.

COLUMN 7

Line 5, "lengthwisely" should read --lengthwise--.
    Line 38, "miro-" should read --micro---.
    Line 43, "micofiche F" should read --microfiche F--.

COLUMN 9

Line 33, "plate 3" should read --plate 32--.
    Line 44, "alone" should read --along--.

UNITED STATES PATENT AND TRADEMARK OFFICE
CERTIFICATE OF CORRECTION

PATENT NO. : 4,704,019
DATED : November 3, 1987
INVENTOR(S) : YASUHIRO YAMAMOTO

It is certified that error appears in the above-identified patent and that said Letters Patent is hereby corrected as shown below:

COLUMN 10

Line 35, "transaprent" should read --transparent--.
Line 57, "wherin" should read --wherein--.

Signed and Sealed this

Thirteenth Day of September, 1988

Attest:

DONALD J. QUIGG

Attesting Officer

Commissioner of Patents and Trademarks